United States Patent
Zhang et al.

(10) Patent No.: US 9,782,919 B2
(45) Date of Patent: Oct. 10, 2017

(54) FEEDING MECHANISM

(71) Applicants: SHENZHEN FUTAIHONG PRECISION INDUSTRY CO., LTD., Shenzhen (CN); FIH (HONG KONG) LIMITED, Kowloon (HK)

(72) Inventors: Peng-Fei Zhang, Shenzhen (CN); Cun-Hui Tian, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 381 days.

(21) Appl. No.: 14/592,059

(22) Filed: Jan. 8, 2015

(65) Prior Publication Data
US 2015/0201536 A1    Jul. 16, 2015

(30) Foreign Application Priority Data
Jan. 13, 2014   (CN) .......................... 2014 1 0013663

(51) Int. Cl.
*H05K 13/02*   (2006.01)
*B29C 45/14*   (2006.01)

(52) U.S. Cl.
CPC ............. *B29C 45/14008* (2013.01)

(58) Field of Classification Search
CPC ...... B29C 45/14008; B29C 2045/14057; B25J 19/0091; B25B 5/00; B25B 11/00
USPC ............ 269/21; 267/160; 414/751.1; 29/559
See application file for complete search history.

(56) References Cited

U.S. PATENT DOCUMENTS

| | | | | |
|---|---|---|---|---|
| 5,065,495 A | * | 11/1991 | Narushima | ........... B25B 11/005 269/21 |
| 7,056,076 B2 | * | 6/2006 | Ichikawa | ............. B65H 19/123 414/806 |
| 8,496,426 B2 | * | 7/2013 | Na | ..................... G01R 31/2893 414/749.1 |

* cited by examiner

*Primary Examiner* — Scott Lowe
(74) *Attorney, Agent, or Firm* — Steven Reiss

(57) ABSTRACT

A feeding mechanism configured to feed a plurality of work pieces to a mold includes a feeding assembly and a fetching assembly. The feeding assembly includes a first adjusting portion and a second adjusting portion. The first adjusting portion includes a first movable plate, a second movable plate, and a guiding member. An end of the guiding member passes through the second adjusting portion and is elastically received in the first movable plate. Another end of the guiding member is extended through the second movable plate and exposed out from the second movable plate for being sleeved around the work pieces. The fetching assembly fetches the work pieces from the feeding assembly and carries the work pieces to the mold.

20 Claims, 4 Drawing Sheets

FEEDING MECHANISM

FIELD

The subject matter herein generally relates to feeding mechanisms, and particularly to an automatically feeding mechanism used in a molding process.

BACKGROUND

Work pieces of portable electronic devices such as mobile phones, are made of different materials such as metal and plastic and are commonly integrated to form a housing by insert molding.

BRIEF DESCRIPTION OF THE DRAWINGS

Many aspects of the present disclosure can be better understood with reference to the drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Figure 1:
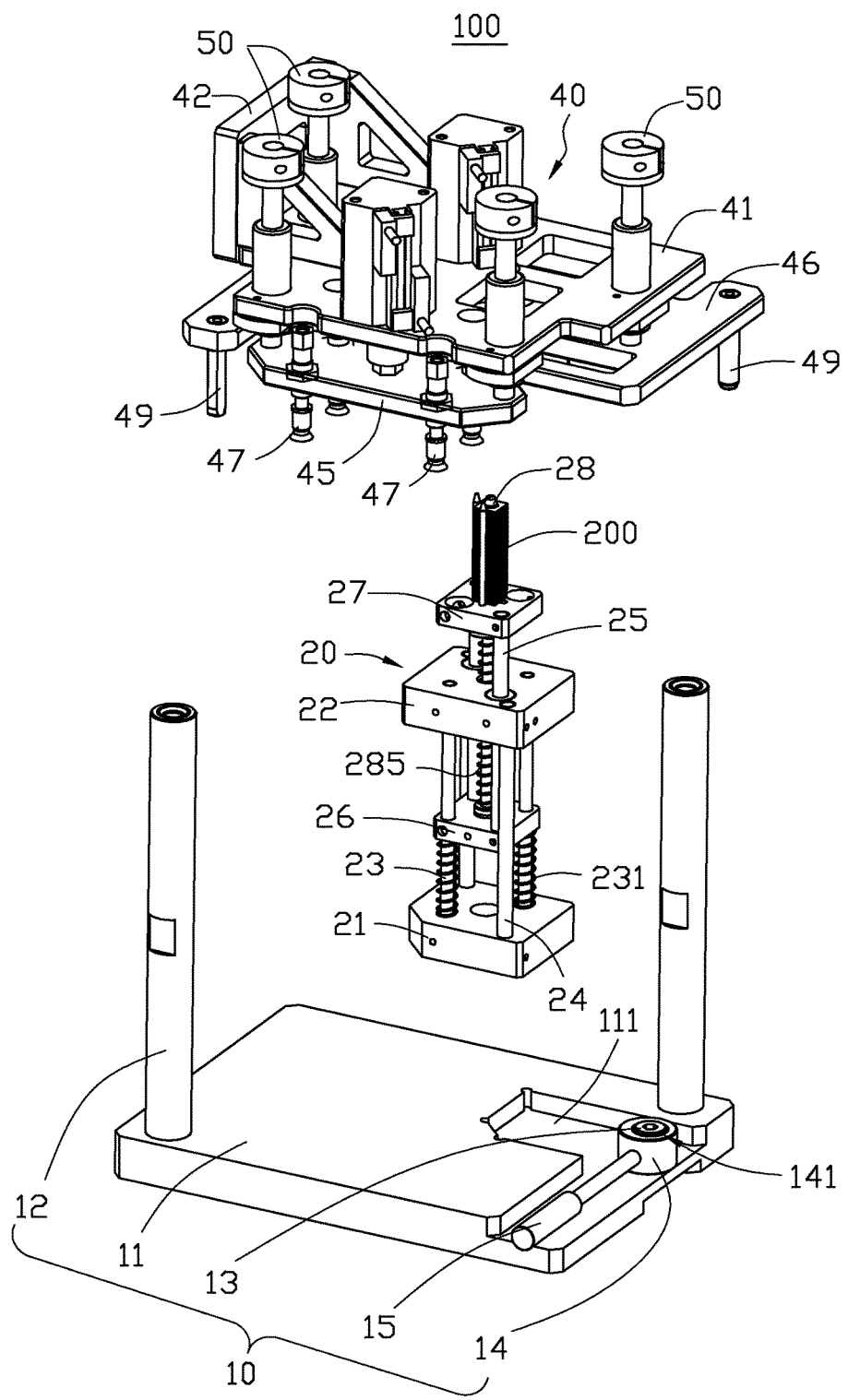
FIG. 1 is an exploded, isometric view of a feeding mechanism, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 is an isometric view of a feeding mechanism 100, according to an exemplary embodiment. The feeding mechanism 100 is configured to feed the work pieces 200 to a workstation, such as a mold (not shown). In this exemplary embodiment, the work pieces 200 are metal sheets. The feeding mechanism 100 includes a securing assembly 10, a feeding assembly 20, and a fetching assembly 40. The feeding assembly 20 is assembled on the securing assembly 10. The work piece 200 is placed on the feeding assembly 20. The fetching assembly 40 is driven by a driving device (not shown) to move toward the feeding assembly 20 for fetching the metal pieces 200 and transporting the metal pieces 200 to the mold one by one.

The securing assembly 10 includes a base plate 11, a plurality of supporting posts 12, a positioning pin 13, an eccentric block 14 and a handling rod 15. The base plate 11 is a substantially rectangular plate. A substantially L-shaped receiving slot 111 is defined in the base plate 11 extending along an edge of the base plate 11. In this exemplary embodiment, there are two supporting posts 12. Each supporting post 12 is a hollow cylinder and positioned at two opposite corners of the base plate 11. The positioning pin 13 is received in the receiving slot 111, and perpendicularly secured on the edge of the base plate 11. The eccentric block 14 is substantially cylindrical. An eccentric hole 141 is defined in the eccentric block 14 and deviated from a center of the eccentric block 14. The eccentric block 14 is sleeved around the positioning pin 13 through the eccentric hole 141. The handling rod 15 is fixed to a sidewall of the eccentric block 14. The eccentric block 14 can be rotated relative to the positioning pin 13 by operating the handling rod 15.

The feeding assembly 20 includes a first fixed plate 21, a second fixed plate 22, a plurality of first connecting rods 23, a plurality of second connecting rods 24, a plurality of third connecting rods 25, a first movable plate 26, a second movable plate 27, and a guiding member 28.

Figure 2:
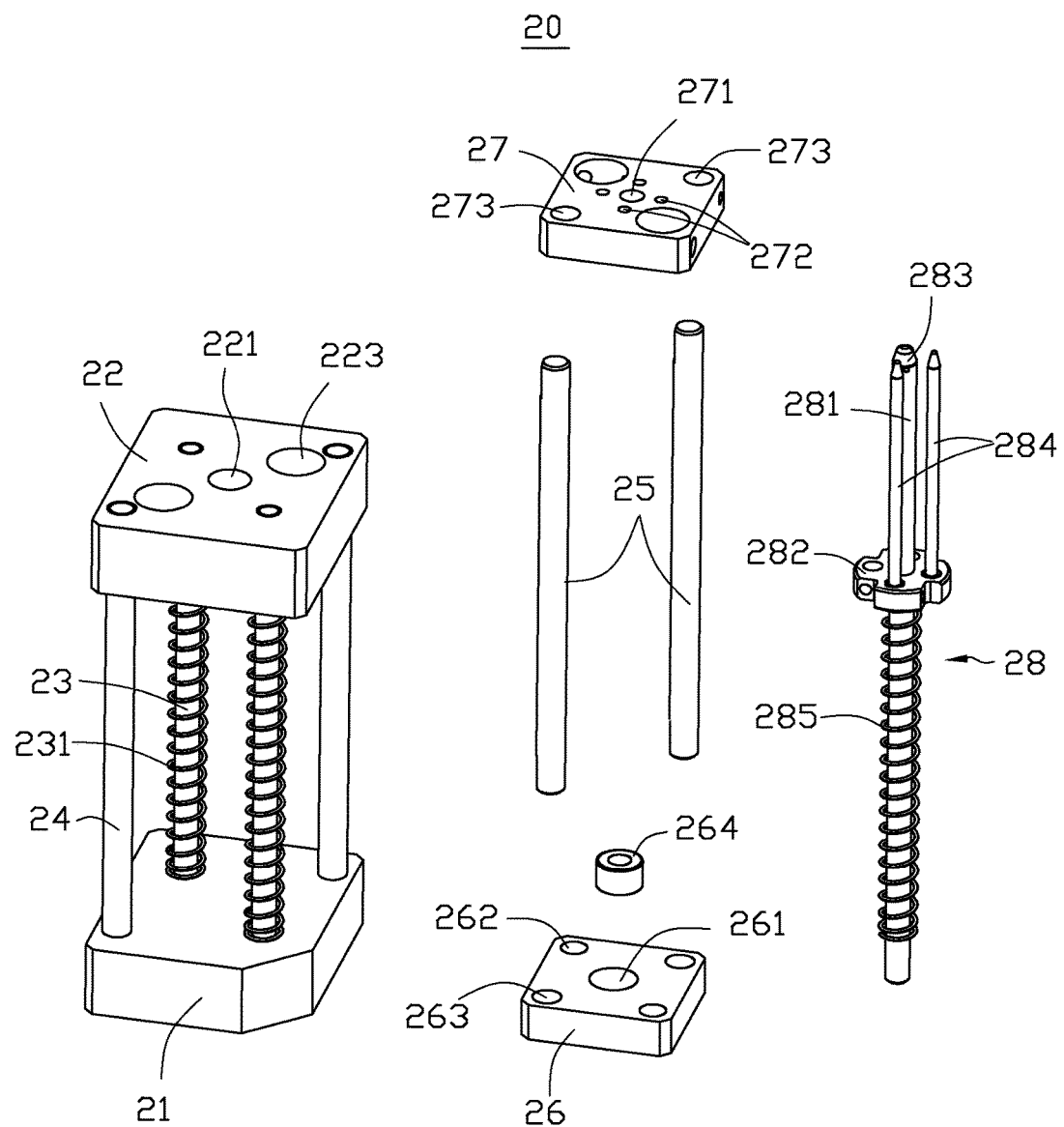
FIG. 2 is an exploded view of a feeding assembly of the feeding mechanism of FIG. 1.

FIG. 2 illustrates the first connecting rods 23 and the second connecting rods 24 are perpendicularly and securely positioned between the first fixed plate 21 and the second fixed plate 22. In this exemplary embodiment, there are two first connecting rods 23 positioned at two opposite corners of the first and second fixed plate 21, 22 and two second connecting rods 24 positioned at other two opposite corners of the first and second fixed plate 21, 22. A first elastic member 231 is placed around each first connecting rod 23. The first fixed plate 21 is positioned in the receiving slot 111. The eccentric block 14 (shown in FIG. 1) can be rotated relative to the positioning pin 13 to resist against the first fixed plate 21 so that the first fixed plate 21 can be fixedly received in the receiving slot 111. A first guiding hole 221 is defined in a center of the second fixed plate 22. Two second guiding holes 223 are defined in the second fixed plate 22 at two sides of the first guiding hole 223.

A mounting hole 261 is defined in a center of the first movable plate 26 corresponding to the first guiding hole 221. Two opposite first through holes 262 and two opposite second through holes 263 are defined in four corners of the first movable plate 26 surrounding the mounting hole 261. A guiding ring-shaped resisting post 264 is partially received in the mounting hole 261 with two opposite ends of the resisting post 264 exposed out from the mounting hole 261. The first movable plate 26 is positioned between the first fixed plate 21 and the second fixed plate 23 with the first connecting rods 23 slidably extended through the first through holes 262 and the first elastic members 231 positioned between the first fixed plate 21 and the first movable plate 26.

A first inserting hole 271 is defined in a center of the second movable plate 27 corresponding to the mounting hole 221 and the first guiding hole 261. Two second inserting holes 272 are defined in the second movable plate 27 adjacent to the first inserting hole 271. Two third inserting holes 273 are defined at two opposite corners of the second movable plate 27 corresponding to the second guiding holes 223 and the second through holes 263.

The guiding member 28 includes a guiding rod 281 and a limiting plate 282 secured on the guiding rod 281. A taper-shaped guiding end 283 is formed at an end of the guiding rod 281. Two limiting rods 284 protrude from the limiting plate 282 and are flush with the guiding end 283 corresponding to the second inserting holes 272. The guiding end 283 is passed through the first inserting hole 271. Another end of the guiding rod 281 opposite to the guiding end 283 is passed through the first guiding hole 221 and fixedly received in the resisting post 264. The second elastic member 285 is positioned between the limiting plate 282 and the first movable plate 26.

An end of each third connecting rod 25 is passed through one of the second guiding holes 223 and fixedly received in the corresponding second through hole 263. Another end of each third connecting rod 25 is fixedly received in the corresponding third inserting hole 273.

Figure 3:
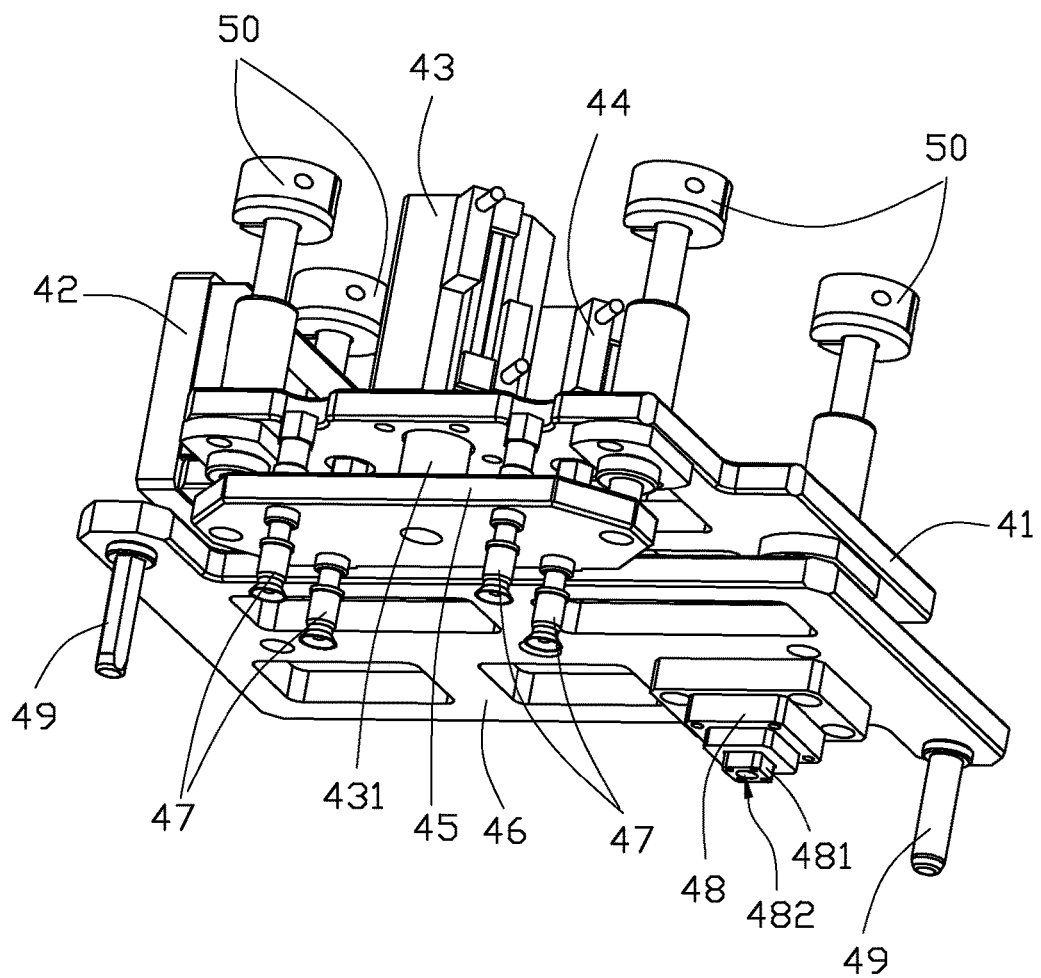
FIG. 3 is a isometric view of a fetching assembly of the feeding mechanism of FIG. 1.

FIG. 3 illustrates the fetching assembly 40 includes a first mounting plate 41, a second mounting plate 42, a first cylinder 43, a second cylinder 44, a first plate 45, a second plate 46, a first fetching member 47, a second fetching member 48, two positioning posts 49, and a plurality of resisting members 50.

The second mounting plate 42 is secured on an end of the first mounting plate 41. The first cylinder 43 and the second cylinder 44 are positioned on the first mounting plate 41 and spaced from each other. The first cylinder 43 includes a first telescopic end 431. The telescopic end 431 is mounted on the first cylinder 43 and exposed from the first mounting plate 42. The second cylinder 44 includes a second telescopic end (not shown) similar to the first cylinder 43. The first plate 45 is fixed to the first telescopic end 431. The second plate 46 is fixed on the second telescopic end. The first fetching member 47 is mounted on the first plate 45. In this exemplary embodiment, there are four first fetching members 47. Each first fetching member 47 is substantially cylindrical. The second fetching member 48 is substantially step-shaped. An end surface 481 of the second fetching member 48 opposite to the second plate 46 defines a resisting hole 482. A shape of the resisting hole 482 corresponds to the guiding end 283. Two positioning posts 49 are positioned on two opposite ends of the second plate 46, respectively, corresponding to the supporting posts 12. The resisting members 50 are positioned on the first plate 41 with an even space between. Two of the resisting members 50 positioned at two sides of the first cylinder 43 resist against the first plate 45. The other two resisting members 50 positioned at two sides of the second cylinder 44 resist against the second plate 46. When the first cylinder 43 and the second cylinder 44 push the first plate 45 and the second plate 46 to move toward or away from the feeding assembly 20, respectively, the resisting members 50 prevent the first plate 45 and the second plate 46 from shaking so that the first plate 45 and the second plate can be stably moved.

The first movable plate 26, the second movable plate 27, the second elastic member 285, the third connecting rods 25, and the guiding member 28 are defined as a first adjusting portion. The first fixed plate 21, the second fixed plate 22, the first connecting rods 23, the second connecting rods 24, and the first elastic members 231 are integrated as a second adjusting portion.

Figure 4:
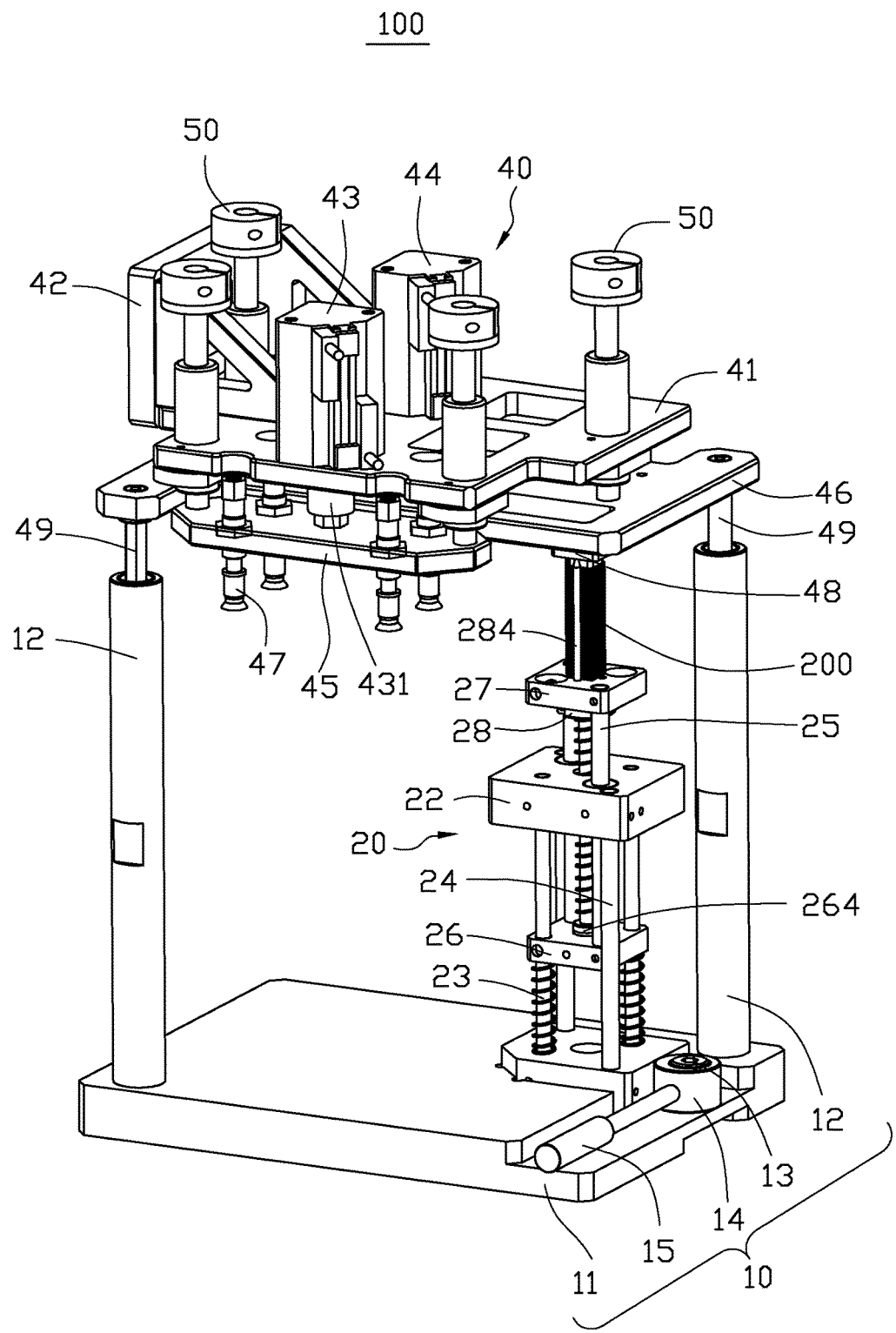
FIG. 4 is an assembled, isometric view of the feeding mechanism of FIG. 1.

FIG. 4 illustrates, in use, the work pieces 200 are placed on the second movable plate 27 and sleeved around the guiding rod 281. In this exemplary embodiment, the number of the work pieces 200 that can be carried by the feeding assembly 20 once is not more than two hundred. It should be noted that, before using the feeding mechanism, the work pieces 200 carried by the feeding assembly 20 should be evaluated to avoid damaging the feeding assembly 20 due to overweight. The two limiting rods 284 resist against edges of the work pieces 200 to prevent the work pieces 200 from shaking. Because of the work pieces 200 placed on the second movable plate 27, the second movable plate 27 is pressed and moved toward the second fixed plate 22. The third connecting rods 25 are slid along the second guiding holes 223 until the second movable plate 27 resists against the limiting plate 282. The second elastic member 285 resists between the limiting plate 282 and the resisting post 264. The first movable plate 26 is moved toward the first fixed plate 21 along the first connecting rods 23 until the first adjusting portion is statically positioned on the second adjusting portion, which is defined as a first position.

A driving device (not shown) is assembled to the fetching assembly 40 through the second mounting plate 42. The first fetching members 47 and the second fetching member 48 are connected to a vacuum pump (not shown), respectively. The vacuum pumps is configured for providing air to the first fetching members 47 and the second fetching member 48. The driving device drives the fetching assembly 40 to move toward the work pieces 200. The resisting hole 482 is aligned with the guiding end 283. The guiding end 283 is further moved toward the second movable plate 27 until one of the work pieces 200 is attached to the end surface 481, and in sequence the first adjusting portion arrives at a second position. The positioning posts 49 are received in the supporting posts 12, respectively, and are slid toward the base plate 11 until the first mounting plate 41 resists against the supporting posts 12 and in sequence the first adjusting portion is stopped at a third position. The second fetching member 48 fetches one of the work pieces 200. The driving device drives the fetching assembly 40 to slowly move away from the feeding assembly 20 to prevent the remaining work pieces 200 from separating from the guiding rod 281 due to elastic forces of the first elastic member 231 and the second elastic member 285.

The driving device drives the fetching assembly 40 carried with the work piece 200 toward the mold and places the work piece 200 in the mold. A housing (not shown) can be formed in the mold with the work piece 200 by a molding process. The driving device drives the first fetching members 47 to move toward the housing. The first fetching members 47 fetch the housing from the mold by the vacuum pump to a next station such as a testing region. Meanwhile, the driving device drives the second fetching member 48 to fetch the next work piece 200 and place the next work piece 200 in the mold for a next molding process.

During the process of continuously fetching the work pieces 200 from the feeding assembly 20, the number of the work pieces 200 placed on the second movable plate 27 is decreased; the first position and the second position are changed. In the embodiment, a first distance between the first adjusting portion and the first fixed plate 21 is increased, and a second distance that the second fetching member 48 resisting against the work piece 200 at a top surface of the guiding rod 281 is increased. However, the third position is unchanged and the fetching assembly 40 always fetches the work pieces 200 at the third position.

In other embodiments, the second connecting rods 24 can be omitted as long as the first connecting rods 23 can support the first fixed plate 21 and the second fixed plate 22. In addition, the resisting post 264 also can be omitted as long as the second elastic member 285 can be resisted between the first movable plate 26 and the limiting plate 282.

The feeding mechanism 100 employs the fetching assembly 40 to feed the work pieces 200 to the mold and fetch the housing from the mold at the same time. In addition, the work pieces 200 can be fed into the mold one by one by the feeding assembly 20 and the fetching assembly 40. Therefore, feeding efficiency and production efficiency are increased.

It is to be understood, however, that even through numerous characteristics and advantages of the present disclosure have been set forth in the foregoing description, together with details of assembly and function, the disclosure is illustrative only, and changes may be made in the details, especially in the matters of shape, size, and arrangement of parts within the principles of the disclosure to the full extent indicated by the broad general meaning of the terms in which the appended claims are expressed.

What is claimed is:

1. A feeding mechanism for feeding a plurality of work pieces to a mold, the feeding mechanism comprising:
   a feeding assembly comprising:
      a first adjusting portion comprising:
         a first movable plate;
         a second movable plate; and
         a guiding member; and
      a second adjusting portion; wherein an end of the guiding member is extended through the second adjusting portion and elastically received in the first movable plate, another end of the guiding member is extended through the second movable plate and exposed out from the second movable plate for being sleeved around the work pieces; and
   a fetching assembly configured for fetching the work pieces from the feeding assembly and carrying the work pieces to the mold.

2. The feeding mechanism of claim 1, wherein the guiding member comprises a guiding rod having a guiding end and a limiting plate secured on the guiding rod, the second movable plate defines a first inserting hole, the guiding end is passed through the first inserting hole, and the limiting plate resists against the second movable plate.

3. The feeding mechanism of claim 2, wherein the limiting plate further comprises a plurality of limiting rods protruding from the liming plate, the second movable plate further defines a plurality of second inserting holes surrounding the first inserting hole and corresponding to the limiting rods, and the limiting rods are extended through the second inserting holes.

4. The feeding mechanism of claim 2, wherein the second adjusting portion comprises:
   a first fixed plate;
   a second fixed plate;
   a plurality of first connecting rods fixedly positioned between the first fixed plate and the second fixed plate; and
   a first elastic member;
   wherein the first movable plate defines a plurality of first through holes, the first movable plate is positioned between the first fixed plate and the second fixed plate with the first connecting rods slidably extended through the first through holes and the first elastic members positioned between the first fixed plate and the first movable plate.

5. The feeding mechanism of claim 4, wherein the second fixed plate defines a first guiding hole, another end of the guiding rod opposite to the guiding end is extended through the first guiding hole and fixed to the first movable plate.

6. The feeding mechanism of claim 5, wherein the first adjusting portion further comprises a second elastic member sleeved around the guiding rod and resisting between the limiting plate and the first movable plate.

7. The feeding mechanism of claim 6, wherein the first adjusting portion further comprises a plurality of second and third connecting rods, the second fixed plate further defines a plurality of second guiding holes corresponding to the second connecting rods, and the second connecting rods are extended through the corresponding second guiding holes with two opposite ends of each third connecting rod fixed to the first movable plate and the second movable plate.

8. The feeding mechanism of claim 7, wherein the first movable plate defines a plurality of second through holes, the second movable plate defines a plurality of third inserting holes, two opposite ends of each third connecting rod are fixedly received in one of the second through holes and one of the third inserting holes.

9. The feeding mechanism of claim 1, wherein the fetching assembly comprises:
   a first mounting plate;
   a second mounting plate secured on an end of the first mounting plate;
   a first cylinder and a second cylinder positioned on the first mounting plate and spaced from each other;
   a first plate assembled to the first cylinder; and
   a second plate assembled to the second cylinder.

10. The feeding mechanism of claim 9, wherein the fetching assembly further comprises:
    a plurality of first fetching member fixed on the first plate;
    a second fetching member fixed on the second plate; and
    two positioning posts fixed on two opposite corners of the second plate,
    wherein the second fetching member defines a resisting hole corresponding to the guiding end.

11. The feeding mechanism of claim 10, further comprising a securing assembly, the securing assembly comprises a base plate and two supporting posts protruding from the base plate and corresponding to the positioning posts, wherein the positioning posts are slidably received in the supporting posts.

12. The feeding mechanism of claim 11, wherein the securing assembly comprises a positioning pin, an eccentric block and a handling rod, the base plate defines a receiving slot, the positioning pin is fixedly received in the receiving slot, the eccentric block defines an eccentric hole, the eccentric block is sleeved around the positioning pin through the eccentric hole, the handling rod is fixed to a sidewall of the eccentric block.

13. The feeding mechanism of claim 12, wherein the feeding assembly is partially received in the receiving slot, the eccentric block resists against the feeding assembly to fix the feeding assembly in the receiving slot by rotating the eccentric block relative to the positioning pin through the handling rod.

14. A feeding assembly comprising:
    a first adjusting portion, the first adjusting portion comprising:
       a first movable plate;
       a second movable plate; and
       a guiding member; and
    a second adjusting portion; wherein an end of the guiding member passes through the second adjusting portion and is elastically received in the first movable plate, another end of the guiding member is extended through the second movable plate and exposed out from the second movable plate for being sleeved around the work pieces.

15. The feeding assembly of claim 14, wherein the guiding member comprises a guiding rod having a guiding end and a limiting plate secured on the guiding rod, the second movable plate defines a first inserting hole, the guiding end is passed through the first inserting hole, the limiting plate resists against the second movable plate.

16. The feeding assembly of claim 15, wherein the limiting plate further comprises a plurality of limiting rods protruding from the liming plate, the second movable plate further defines a plurality of second inserting holes surrounding the first inserting hole and corresponding to the limiting rods, the limiting rods are extended through the second inserting holes.

17. The feeding assembly of claim 15, wherein the second adjusting portion comprises a first fixed plate, a second fixed plate, a plurality of first connecting rods fixedly positioned between the first fixed plate and the second fixed plate, and a first elastic member; the first movable plate defines a plurality of first through holes, the first movable plate is positioned between the first fixed plate and the second fixed plate with the first connecting rods slidably extended through the first through holes and the first elastic members positioned between the first fixed plate and the first movable plate.

18. The feeding assembly of claim 17, wherein the second fixed plate defines a first guiding hole, another end of the guiding rod opposite to the guiding end is extended through the first guiding hole and fixed to the first movable plate.

19. The feeding assembly of claim 18, wherein the first adjusting portion further comprises a second elastic member sleeved around the guiding rod and resisting between the limiting plate and the first movable plate.

20. The feeding mechanism of claim 19, wherein the first adjusting portion further comprises a plurality of second and third connecting rods, the second fixed plate further defines a plurality of second guiding holes corresponding to the second connecting rods, the second connecting rods are extended through the corresponding second guiding holes with two opposite ends of each third connecting rod fixed to the first movable plate and the second movable plate.

* * * * *